United States Patent [19]
Ohta

[11] Patent Number: 5,721,719
[45] Date of Patent: Feb. 24, 1998

[54] RECORDED SIGNAL DETECTION APPARATUS

[75] Inventor: Shinichi Ohta, Tokyo, Japan

[73] Assignee: Canon Kabushiki Kaisha, Tokyo, Japan

[21] Appl. No.: 748,619

[22] Filed: Nov. 13, 1996

Related U.S. Application Data

[63] Continuation of Ser. No. 391,564, Feb. 21, 1995, abandoned.

[30] Foreign Application Priority Data

Feb. 22, 1994 [JP] Japan ..................... 6-024240

[51] Int. Cl.$^6$ ....................................... G11B 5/09
[52] U.S. Cl. ............................. 369/59; 369/58
[58] Field of Search ....................... 369/54, 58, 116, 369/47, 48, 49, 53, 59, 124

[56] References Cited

U.S. PATENT DOCUMENTS

| | | | |
|---|---|---|---|
| 5,229,985 | 7/1993 | Oshiba | 369/54 |
| 5,233,593 | 8/1993 | Ha | 369/60 |
| 5,309,420 | 5/1994 | Jaquette et al. | 369/58 |

*Primary Examiner*—Paul W. Huber
*Attorney, Agent, or Firm*—Fitzpatrick, Cella, Harper & Scinto

[57] ABSTRACT

A recorded signal detection apparatus detects information recorded on an information recording medium in the form of a digital signal so as to prevent a detection error caused by defects without lowering the detection sensitivity to information pits. In the recorded signal detection apparatus, any change in a binary signal reproduced from the recording medium is detected, and when the binary signal changes a plurality of number of times within a predetermined period of time, a detection signal of a recorded information signal is output.

5 Claims, 12 Drawing Sheets

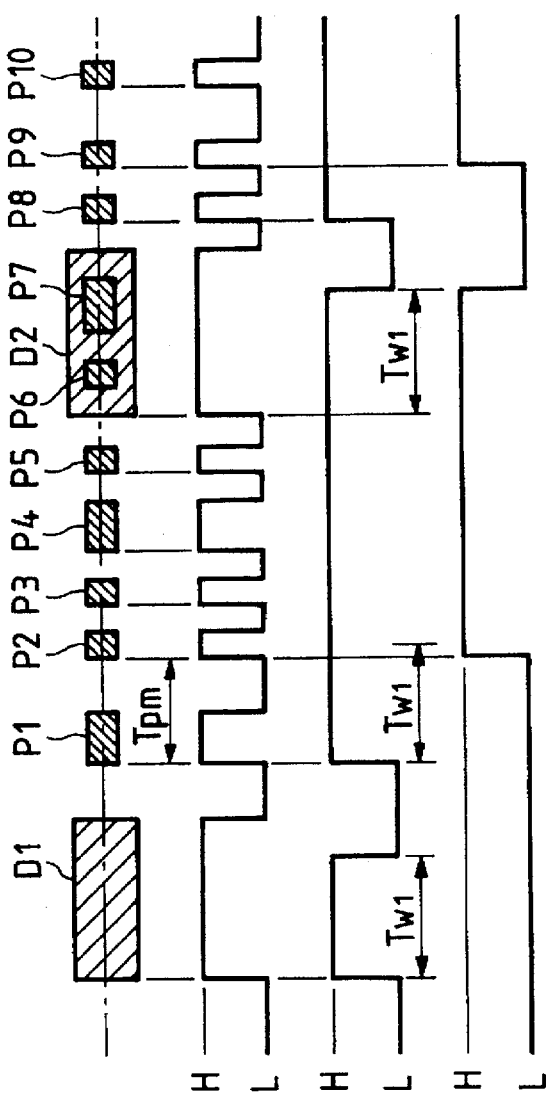

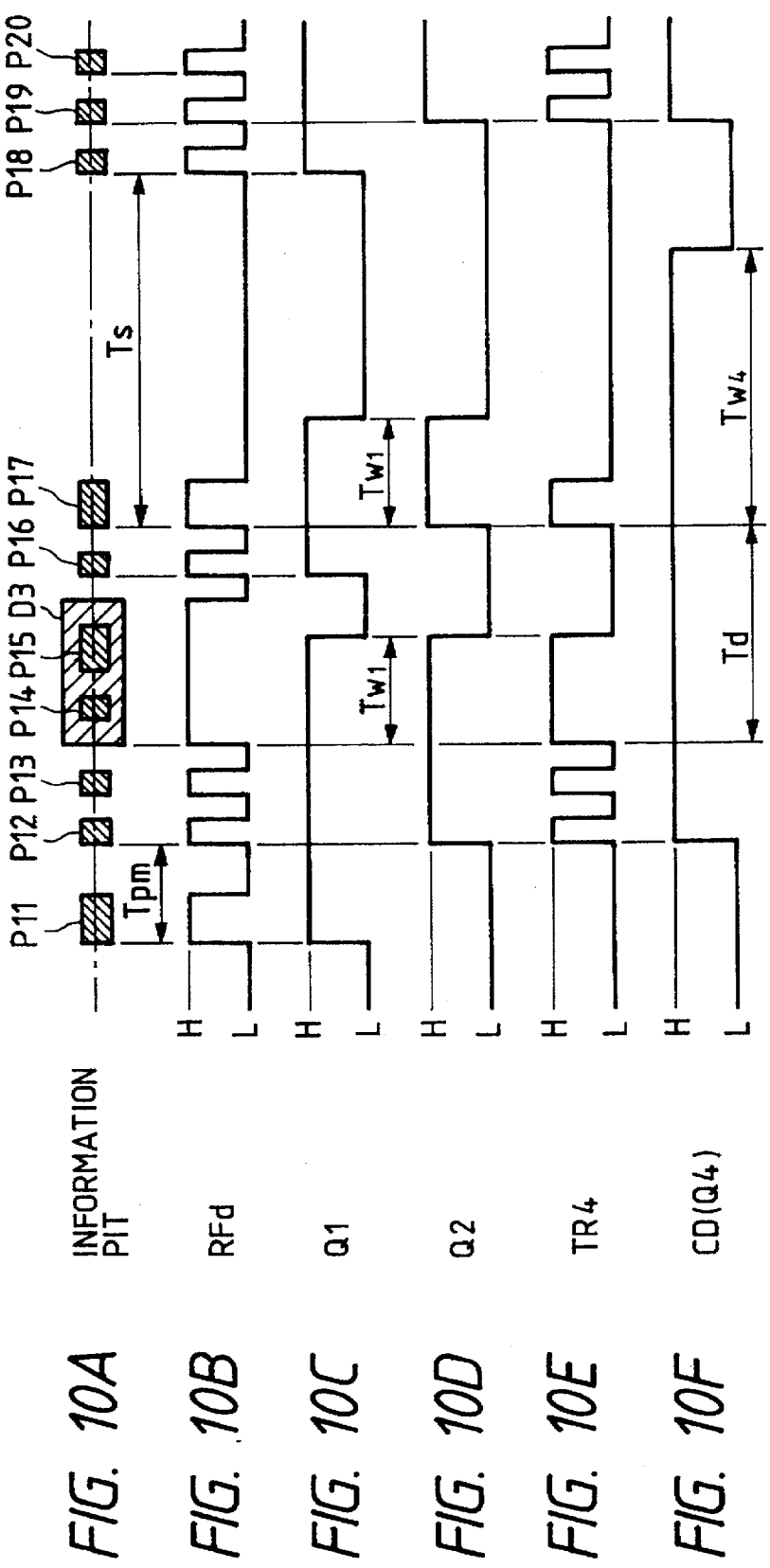

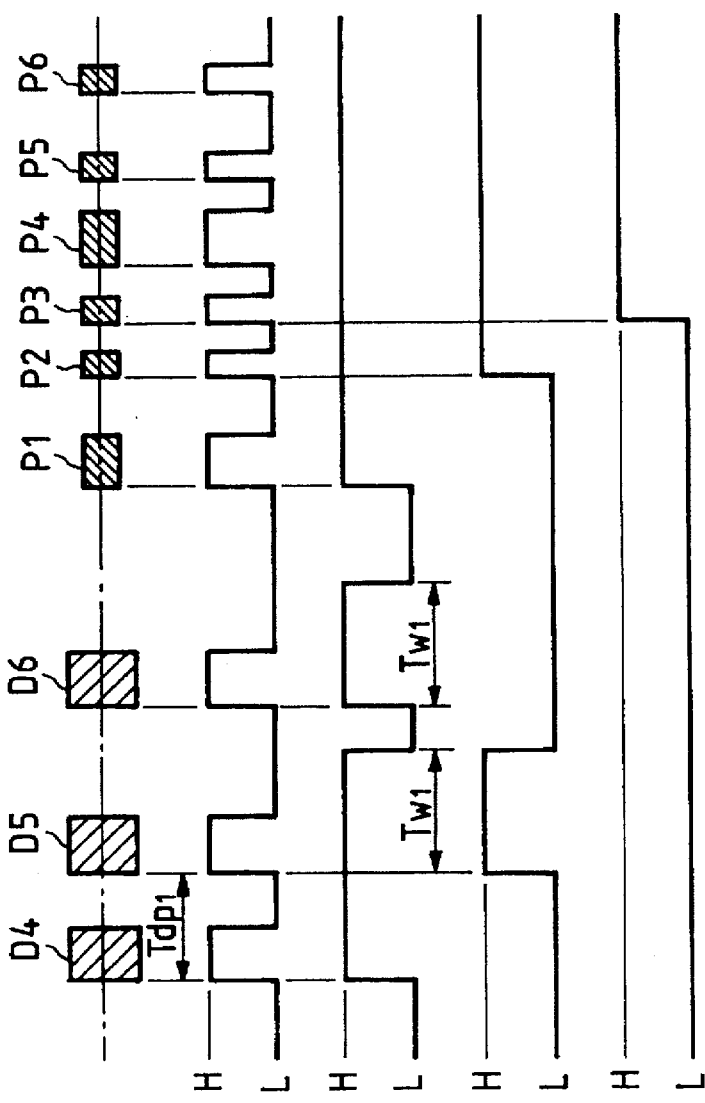

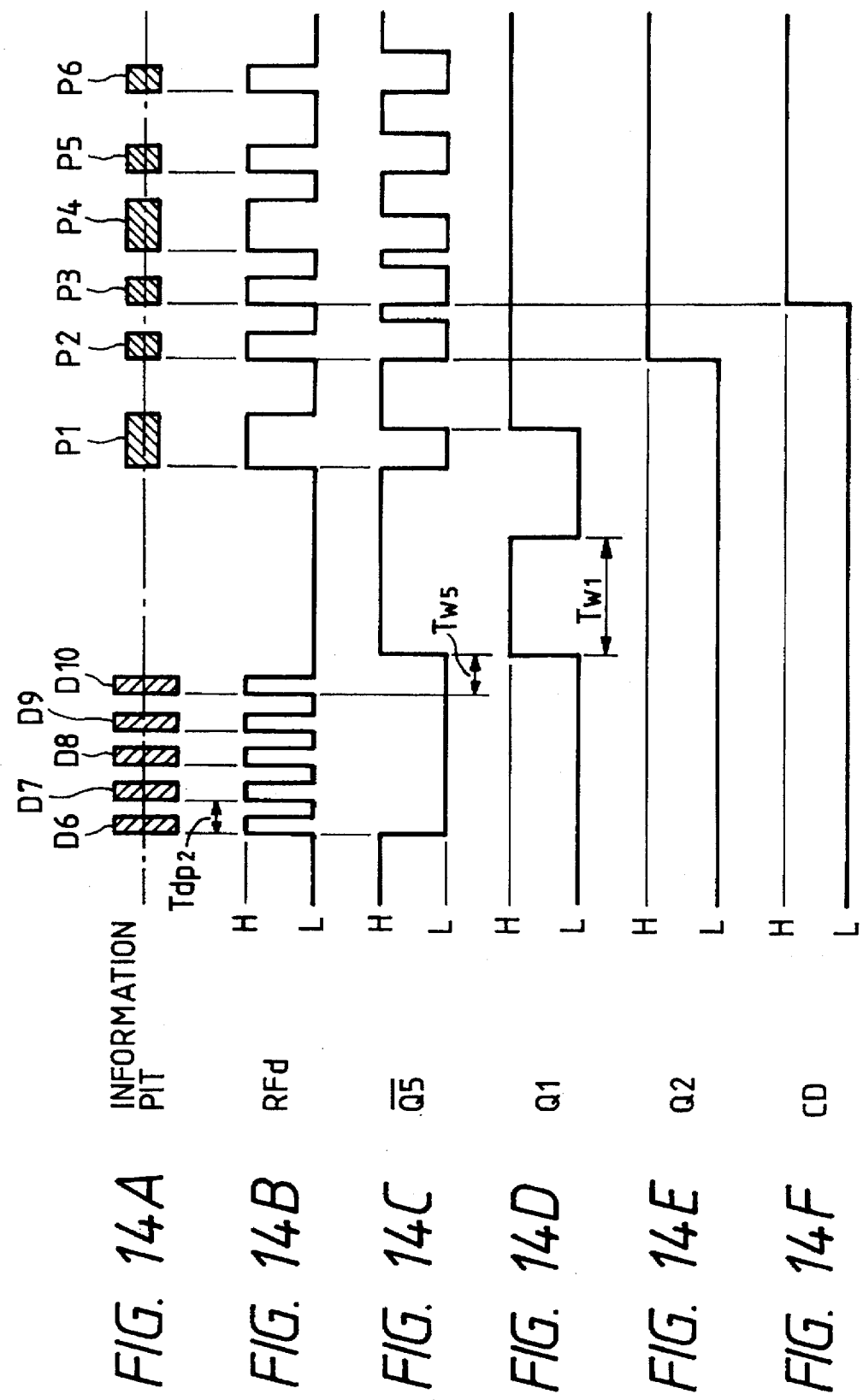

RECORDED SIGNAL DETECTION APPARATUS

This application is a continuation of application Ser. No. 08/391,564 filed on Feb. 21, 1995, now abandoned.

BACKGROUND OF THE INVENTION

1. Field of the Invention

The present invention relates to a recorded signal detection apparatus for detecting an information signal recorded on an information recording medium and, more particularly, to a recorded signal detection apparatus suitable for detection of an optically recorded signal.

2. Related Background Art

As a conventional information recording method for recording information in the form of a digital signal, a magnetic recording method, an optical recording method, or a magnetooptical recording method is available. In the following description, optical recording will be exemplified. As the types of recording media on or from which information is optically recorded or read out, various types of media such as a disk-shaped medium, a card-shaped medium, a tape-shaped medium, and the like are known. In particular, it is expected that the card-shaped recording medium (to be referred to as an optical card hereinafter) will be used in a wide range of applications due to its easiness of manufacture, high portability, high accessibility, and the like.

FIG. 1 is a plan view showing the recording surface of a general optical card. On the information recording surface of an optical card C shown in FIG. 1, a plurality of parallel information tracks $Ta_1$, $Ta_2$, $Ta_3$, . . . are aligned in an LF direction. A tracking track is formed between each of two adjacent information tracks. When information is recorded, a light spot is scanned on a given information track using the tracking tracks as guide tracks, thereby recording digital information on the information track as an information pit train.

Track numbers indicating the positions of the information tracks Ta are added to regions TN1 and TN2 at the two ends of the information tracks Ta on the optical card C. In this case, one of the regions TN1 and TN2 may be omitted. However, in order to detect the track number at the beginning of scanning of a light beam spot regardless of the scanning direction on the optical card C, the regions are preferably added to the two sides of the information recording region. Therefore, the regions TN1 and TN2 record identical numbers.

When information is recorded on the information tracks Ta, only one information file may be recorded on a single track, as indicated by S1 in FIG. 1. However, when the information amount of an information file to be recorded is small, it is effective to record the file while dividing a single track into a plurality of sectors. S2 and S3 represent an example wherein information files are recorded on a single information track Ta which is divided into two sectors. When an information track is divided, the number of sectors obtained by division is not particularly limited. However, it is a common practice to set a minimum recording information amount of each sector to be 32 bytes or 16 bytes. The tracks above S1 and S2 in FIG. 1 correspond to a non-recorded region.

Furthermore, when an information file is recorded, it is a general practice to simultaneously record a directory file representing management information of the information file. In such a file management method using a directory, a region where the directory file is recorded is determined in advance at the software side. When an information file is reproduced, the directory file is reproduced to check its contents, the recorded position of a target information file is retrieved based on the management information, and thereafter, the target information file is reproduced.

Various optical information recording/reproduction apparatuses for such an optical card have been proposed. In either apparatus, recording and reproduction are performed while always executing auto-tracking control and auto-focusing control. Information is recorded on a recording medium by scanning a light beam, which is modulated according to the information to be recorded and is focused to a very small light spot, onto an information track, and the information is recorded as an information pit train which can be optically detected. Information is reproduced from the recording medium by scanning a light beam spot having constant power, which is low enough not to perform recording on the recording medium, onto the information pit train on the information track, and by detecting light reflected by or transmitted through the medium.

FIG. 2 shows the typical arrangement of an optical system of such an information recording/reproduction apparatus. Referring to FIG. 2, a light beam emitted from a semiconductor laser 101 is collimated by a collimator lens 102, and the collimated light beam is split into a plurality of light beams by a diffraction grating 103. These light beams are focused on the optical card C via a polarization beam splitter 104, a quarterwave plate 105, and an objective lens 106. The light beams reflected by the optical card C are incident on a photodetector 109 via the objective lens 106, the quarterwave plate 105, the polarization beam splitter 104, and a toric lens 108. At this time, of the light beams split by the diffraction grating 103, the 0th-order diffracted light beam is used to perform recording, reproduction, and auto-focusing control (to be abbreviated as AF hereinafter), and ±1st-order diffracted light beams are used to perform auto-tracking control (to be abbreviated as AT hereinafter). AF adopts an astigmatism method, and AT adopts a 3-beam method.

FIG. 3 is an enlarged view of an information track and tracking tracks on the optical card. Tracking tracks tt1 and tt2 consist of grooves or a material having a reflectance different from that of a track Ta, and the information track and the tracking tracks are distinguished from each other by forming the grooves or forming portions with a different reflectance. The tracking tracks are used as guide tracks for obtaining a tracking signal. A 0th-order diffracted light beam 110 for recording, reproduction, and AF is irradiated onto the information track Ta, and ±1st-order diffracted light beams 111 and 112 for AT are respectively irradiated onto the tracking tracks tt1 and tt2. A tracking signal is generated based on reflected light beams of the diffracted light beams 111 and 112, and tracking is controlled based on this signal, so that the 0th-order diffracted light beam 110 normally scans on the track Ta.

With this tracking control, the diffracted light beams 110, 111, and 112 are scanned on the optical card in the up-and-down direction in FIG. 3 by a driving mechanism (not shown) while maintaining a constant positional relationship, and information is recorded on the information track Ta. In this case, digital information signals 113a, 113b, and 113c indicated by hatching in FIG. 3 are recorded, and are normally called information pits. Since the information pits 113a, 113b, and 113c have a reflectance different from that of their surrounding portion, when they are scanned with the weak light spot 110 again, the reflected light beam of the 0th-order light beam 110 is modulated by the bits 113a, 113b, and 113c, thus obtaining a reproducing signal.

FIG. 4 is a circuit diagram showing the details of the photodetector 109 shown in FIG. 2, and a signal processing circuit for generating a reproducing signal and a servo error signal by processing the output signal from the photodetector 109. The photodetector 109 is constituted by a total of six photosensors, i.e., a four-split photosensor 114, and photosensors 115 and 116. Light spots 110a, 111a, and 112a are formed by the reflected light beams of the diffracted light beams 110, 111, and 112 in FIG. 3. The light spot 110a is focused on the four-split photosensor 114, and the light spots 111a and 112a are respectively focused on the photosensors 115 and 116. The sensor outputs, in two diagonal directions, of the four-split photosensor 114 are respectively added by adders 117 and 118. The outputs from the adders 117 and 118 are further added by an adder 121, and a sum signal is output as an information reproducing signal RF. More specifically, the signal RF corresponds to a sum total signal of the detection segments of the four-split photosensor 114. The output from the adder 118 is subtracted from the output from the adder 117 by a differential circuit 120, and a difference signal is output as a focusing control signal Af. More specifically, the signal Af corresponds to a difference signal between the sums, in the two diagonal directions, of the four-split photosensor 114. Since this astigmatism method is described in detail in other references, and is not directly related to the present invention, a detailed description thereof will be omitted. The output from the photosensor 116 is subtracted from the output from the photosensor 115 by a differential circuit 119, and a difference signal is output as a tracking control signal At. Normally, by controlling the light beams to obtain the signal At=0, the tracking control is attained.

Upon recording of information on a recording medium, it is important to avoid double-recording, i.e., to avoid information from being re-recorded on a region where information has already been recorded. For example, assuming that the sector S2 in FIG. 1 is a recorded sector, if new data to be recorded on the next sector S3 is accidentally recorded on the sector S2, old and new data are double-recorded on the sector S2, and the data on the sector S2 is destroyed. In order to prevent such data destruction, a region on which information is to be recorded is scanned with weak light to detect information on the region, and whether or not information is recorded on the region is determined based on the detection result. In general, such detection of recorded information is called carrier detection (to be abbreviated as CD hereinafter).

FIG. 5 is a circuit diagram showing an example of a recorded signal detection circuit for CD. Referring to FIG. 5, a comparator 122 compares the information reproducing signal RF output from the adder 121 in the signal processing circuit shown in FIG. 4 with a reference value $Vr_1$ to binarize the signal RF. The reference value $Vr_1$ is normally set to be a middle value of the amplitude of the information reproducing signal. The comparator is connected to a reverse-flow prevention diode D1. Resistors R1 and R2, and a capacitor C1 constitute an integration circuit. A comparator 123 compares an output signal RFi from the integration circuit with a reference value $Vr_2$ to output a carrier detection signal (CD signal) indicating that information has already been recorded. Note that a binary signal RFd is supplied to a signal reproduction circuit (not shown), and is compared with a sampling clock to reproduce digital information based on the position or length of the signal.

The operation of the recorded signal detection circuit will be described below with reference to FIGS. 6A to 6D. FIG. 6A shows information pits recorded on the information track on the optical card, and FIG. 6B shows the binary signal RFd output from the comparator 122 when the information pit train is scanned with weak light. In most recording media, since an information pit portion has a lower light reflectance than that of its surrounding portion, when it is reproduced, a binary signal RFd which has a high level in correspondence with the information pit portion, and a low level in correspondence with a portion between adjacent information pits is obtained, as shown in FIG. 6B. The binary signal RFd is integrated by the integration circuit constituted by the diode D1, the resistor R1, and the capacitor C1, and an electric charge on the capacitor C1 is discharged by the resistor R2. More specifically, the capacitor C1 is charged in correspondence with the information pit portion on the information track, and is discharged in correspondence with a portion other than the information pit portion.

In this case, since information pits P101 to P106 are successively recorded, as shown in FIG. 6A, the voltage signal RFi from the capacitor C1 gradually increases while repeating charging and discharging, as shown in FIG. 6C. The voltage signal RFi from the capacitor C1 is compared with the reference value $Vr_2$ by the comparator 123. When the voltage signal RFi exceeds the reference value $Vr_2$, a CD signal indicating that information has already been recorded is output, as shown in FIG. 6D. In this manner, since a CD signal is output when information pits are successively recorded in a region and the voltage from the capacitor C1 exceeds the reference value $Vr_2$, it is determined that information has already been recorded on the region, and further information recording is inhibited. On the other hand, when a CD signal is not output, it is determined that no information is recorded on the region, and information recording in that region is permitted.

However, in the conventional recorded signal detection circuit, when a recording medium suffers from a defect, or when scratches are formed on or dust is attached to the surface of the recording medium (such cases will be generally referred to as defects hereinafter), since the light reflectance of the corresponding portion is lowered, the defect may be erroneously detected as an information pit, and a CD signal may be output. For example, when a defect D10 is present on the information track, as shown in FIG. 6A, if this track is scanned, a binary signal RFd is output in the same manner as an information pit, as shown in FIG. 6B, and the voltage of the capacitor C1 rises, as shown in FIG. 6C, thus outputting a CD signal, as shown in FIG. 6D.

In order to prevent such a detection error, the detection sensitivity may be lowered by setting a large integration time constant defined by the resistor R1 and the capacitor C1 or increasing the reference value $Vr_2$. However, when the detection sensitivity is lowered, a CD signal may not be output although information pits have already been recorded, and double recording may occur. More specifically, since the detection sensitivity to information pits and detection errors of defects have a conflicting relationship, the detection sensitivity to information pits is lowered when a detection error of a large defect is to be prevented. For this reason, it is difficult to perfectly prevent double recording.

SUMMARY OF THE INVENTION

The present invention has been made in consideration of the above-mentioned problems, and has as its object to provide a recorded signal detection apparatus which can prevent a detection error of defects without lowering the detection sensitivity to information pits.

In order to achieve the object of the present invention, there is provided a recorded signal detection apparatus for detecting information recorded on an information recording medium in the form of a digital signal, comprising detection means for detecting a change in a binary signal reproduced from the recording medium, wherein when the binary signal changes a plurality of number of times within a predetermined period of time, a detection signal of a recorded information signal is output.

In order to achieve the above object, there is also provided an apparatus for detecting a recorded information signal, comprising:

means for reproducing a binary signal from an information recording medium; and means for detecting a change in the binary signal, and for, when the means detects that the binary signal changes a plurality of number of times within a predetermined period of time, outputting a detection signal of the recorded information signal.

The above and other objects of the present invention will become apparent from the following description of the embodiments.

BRIEF DESCRIPTION OF THE DRAWINGS

FIGS. 8A to 8D are timing charts showing the operation of the embodiment shown in FIG. 7;

FIGS. 10A to 10F are timing charts showing the operation of the embodiment shown in FIG. 9;

FIGS. 12A to 12E are timing charts showing the operation of the embodiment shown in FIG. 11;

FIGS. 14A to 14F are timing charts showing the operation of the embodiment shown in FIG. 13.

DETAILED DESCRIPTION OF THE PREFERRED EMBODIMENTS

Figure 7:
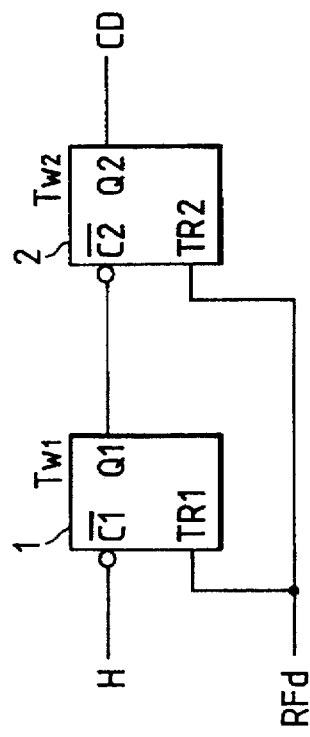
FIG. 7 is a circuit diagram showing the first embodiment of a recorded signal detection apparatus according to the present invention.
Figures 6A, 6B, 6C, 6D:
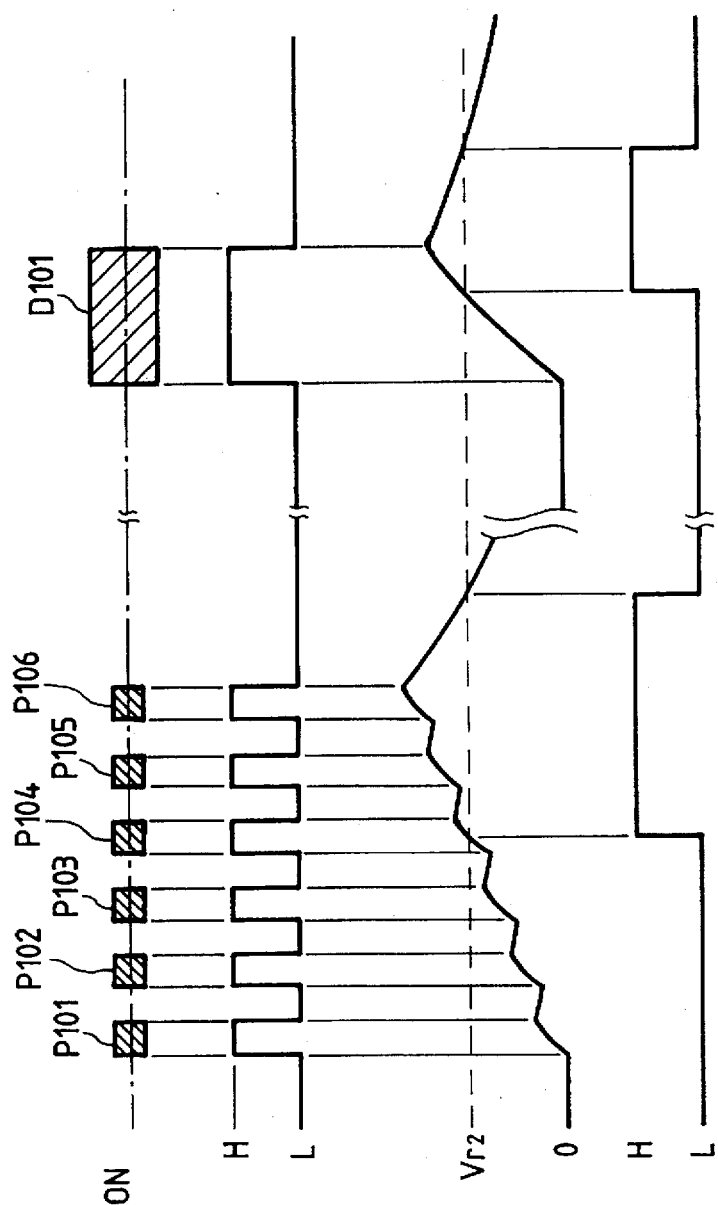
FIGS. 6A to 6D are timing charts showing the operation of the recorded signal detection circuit shown in FIG. 5.

The preferred embodiments of the present invention will be described in detail hereinafter with reference to the accompanying drawings. FIG. 7 is a circuit diagram showing the first embodiment of a recorded signal detection apparatus according to the present invention. The circuit shown in FIG. 7 includes two re-triggerable monostable multivibrators (to be simply referred to as multivibrators hereinafter) 1 and 2. When a trigger signal is input again within a predetermined period of time after input of a first trigger signal, each of the multivibrators 1 and 2 extends its output time by a predetermined period of time from the second trigger signal. As such an element, SN74123 (tradename: available from Texas Instruments Corp.), TC74HC4538 (tradename: available from TOSHIBA Corp.), and the like are preferably used.

Figure 5:
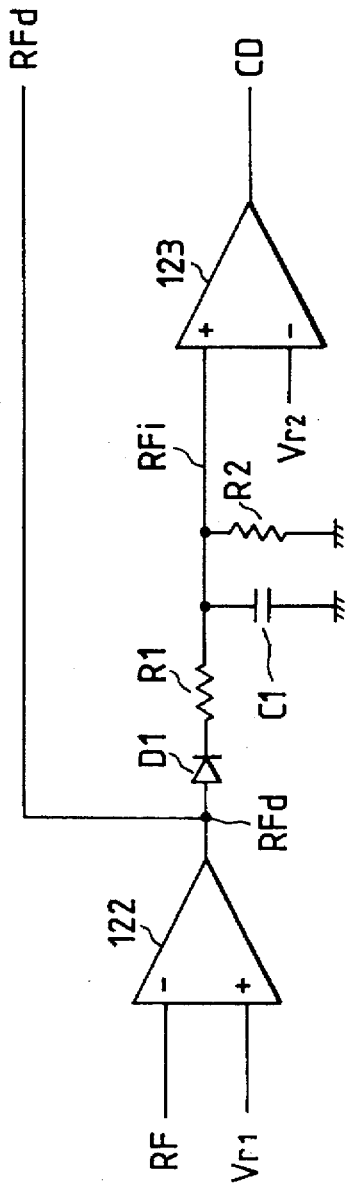
FIG. 5 is a circuit diagram showing a conventional recorded signal detection circuit.

A clear input terminal (inverting input terminal) $\overline{C1}$ of the multivibrator 1 is kept at high level, and its trigger input terminal TR1 receives a binary signal RFd obtained by binarizing an information reproducing signal RF with a reference value $Vr_1$ from the comparator 122 shown in FIG. 5. Therefore, the binary signal RFd is input as a trigger signal to the multivibrator 1. When the trigger signal is input, an output Q1 of the multivibrator 1 goes high in response to the leading edge of the trigger signal, and is held at high level for a setting time period $T_{W1}$. The output Q1 from the multivibrator 1 is input to a clear input terminal (inverting input terminal) $\overline{C2}$ of the next multivibrator 2, and a trigger terminal TR2 of the multivibrator 2 similarly receives the binary signal RFd as a trigger signal. Therefore, an output Q2 from the multivibrator 2 goes high in response to the leading edge of the binary signal RFd only when the output Q1 from the multivibrator 1 is at high level, and is held at high level for a setting time period $T_{W2}$.

The operation of this embodiment will be described below with reference to FIGS. 8A to 8D. FIG. 8A shows information pits optically recorded on an information track of the optical card shown in FIG. 1, and defects present on the information track. P1 to P10 represent information pits, and D1 and D2 represent defects. In this case, as an information recording method, a mark length method for recording information based on the pit size and the inter-pit distance is adopted. The same applies to the following embodiments. FIG. 8B shows a binary signal obtained by scanning the information track shown in FIG. 1 with weak light, i.e., the binary signal RFd of the information reproducing signal RF output from the comparator 122 shown in FIG. 5. The binary signal RFd is output as a high-level signal in correspondence with each information pit, as a low-level signal in correspondence with a portion between each two adjacent information pits, and also as a high-level signal in correspondence with each defect.

Since the binary signal RFd goes high in response to the leading edge of the first defect D1, the output Q1 of the multivibrator 1 goes high in response to the leading edge of the signal RFd and is held at a high level for the time period $T_{W1}$, as shown in FIG. 8C. More specifically, since the defect D1 has a large length and the binary signal RFd does not change within the time period $T_{W1}$, the output Q1 of the multivibrator 1 is held at high level for the predetermined time period $T_{W1}$, and goes low after an elapse of the time period $T_{W1}$. The output Q1 of the multivibrator 1 and the binary signal RFd are respectively input to the clear input terminal $\overline{C2}$ and the trigger input terminal TR2 of the multivibrator 2 to drive the multivibrator 2. In this case, the output Q1 from the multivibrator 1 goes high a given delay time after the binary signal RFd changes from low level to high level. Thus, since the output Q1 of the multivibrator 1 is at low level when the binary signal RFd input to the trigger input terminal TR2 of the multivibrator 2 goes high in response to the leading edge of the defect D1, the multivibrator 2 does not operate, and its output Q2 (CD) is kept at low level, as shown in FIG. 8D. Therefore, the output Q2 of the multivibrator 2 is held at low level in correspondence with the defect D1, and no CD signal is output.

When the binary signal RFd goes high in response to the leading edge of the information pit P1, the output Q1 of the multivibrator 1 goes high in response thereto, as shown in FIG. 8C. Since the binary signal RFd Goes high again in response to the leading edge of the next information pit P2, the multivibrator 1 is re-triggered, and the output Q1 of the multivibrator 1 is still kept at high level. More specifically, since a time period $T_{pm}$ required for scanning a portion from the leading edge of the information pit P1 to the leading edge of the information pit P2 with the light beam is shorter than the setting time period $T_{w1}$ of the multivibrator 1, the multivibrator 1 is re-triggered by the leading edge of the information pit P2, and its output is kept at high level. Therefore, since the time period $T_{w1}$ is set to be longer than the time period $T_{pm}$ required for scanning the maximum pit pitch of the information pit train, the output Q1 of the multivibrator 1 is maintained at high level as long as information pits successively appear.

The output Q1 of the multivibrator 1 goes high in response to the leading edge of the information pit P1, and thereafter, a high-level signal is input to the clear input terminal $\overline{C2}$ of the multivibrator 2. For this reason, the output Q2 of the multivibrator 2 goes high, as shown in FIG. 8D, when the binary signal RFd goes high in response to the leading edge of the information pit P2. In this manner, a CD signal is output, and a controller (not shown) recognizes, based on this CD signal, that information has already been recorded on the currently scanned information track, and controls operation so as not to record new information on the information track. The setting time period $T_{w2}$ of the multivibrator 2 must be set to be longer than the time period $T_{pm}$ as in $T_{w1}$ so as to continuously output the CD signal. In this case, the time period $T_{w2}$ is set to be longer than the time period $T_{w1}$. In FIG. 8A, since the defect D2 is present in the middle of the information pit train, the output Q1 from the multivibrator 1 goes low after an elapse of the time period $T_{w1}$ from the leading edge of the defect D2, as shown in FIG. 8C. Therefore, the output Q2 of the multivibrator 2 goes low at the same time, and the CD signal is interrupted in the middle of the information pit train. The second embodiment which provides an improvement in this respect will be described in detail later.

As described above, in this embodiment, even when a defect is present on an information track, the binary signal RFd does not continuously change within the setting time period $T_{w1}$ independently of the size of the defect. Therefore, no CD signal is output by erroneously detecting the defect as an information pit, and a detection error of an information signal due to the defect can be reliably prevented. Upon detection of information pits, if two or more information pits successively appear, information pits can be reliably detected although only one information pit cannot be detected. Therefore, a detection error due to a defect can be reliably prevented, and recorded information can be detected with high detection sensitivity corresponding to two information pits.

The second embodiment of the present invention will be described below. In the embodiment shown in FIG. 7, as described above, when a defect is present in the middle of an information pit train, a CD signal is interrupted. More specifically, even when the information pits P6 and P7 are recorded, as shown in FIG. 8A, if the defect D2 is present thereon, the information pits P6 and P7 are masked by the defect D2, and the binary signal RFd does not change, as shown in FIG. 8B. As a result, the output Q1 of the multivibrator 1 goes low in the middle of the information pit train, and the CD signal also goes low. After the defect D2, when the information pit P8 and subsequent pits appear, the CD signal is output again. In this manner, the CD signal is interrupted in the middle of the information pit train. Such a phenomenon does not pose any problem if the circuit aims at only detection of a recorded signal. However, using the CD signal not only for detection of a recorded signal but also as a region detection signal is advantageous in terms of simplification of the arrangement of the apparatus.

Figure 1:
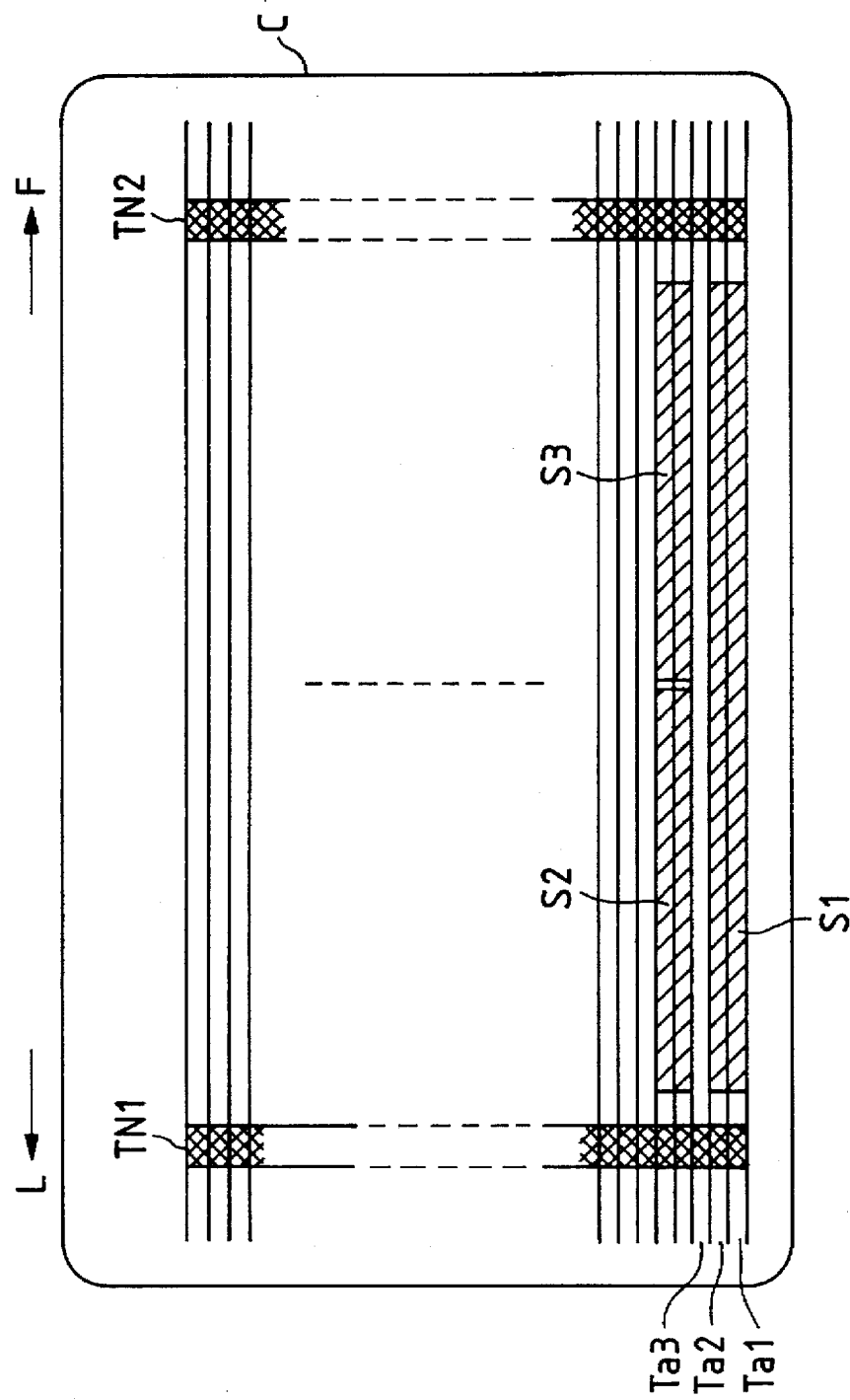
FIG. 1 is a plan view showing the recording surface of an optical card.
Figure 2:
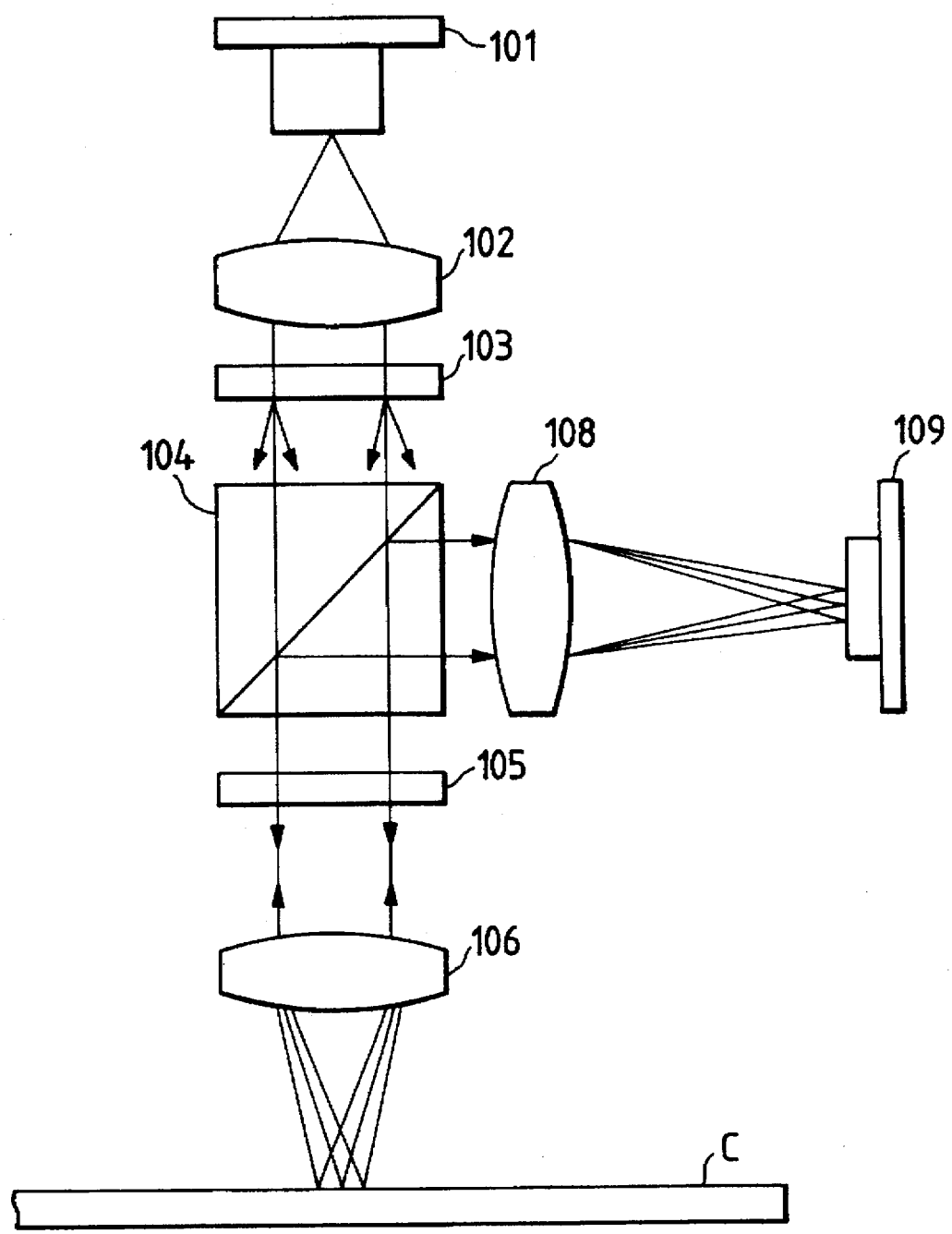
FIG. 2 is a view showing an optical system of a conventional optical information recording/reproduction apparatus.
Figure 3:
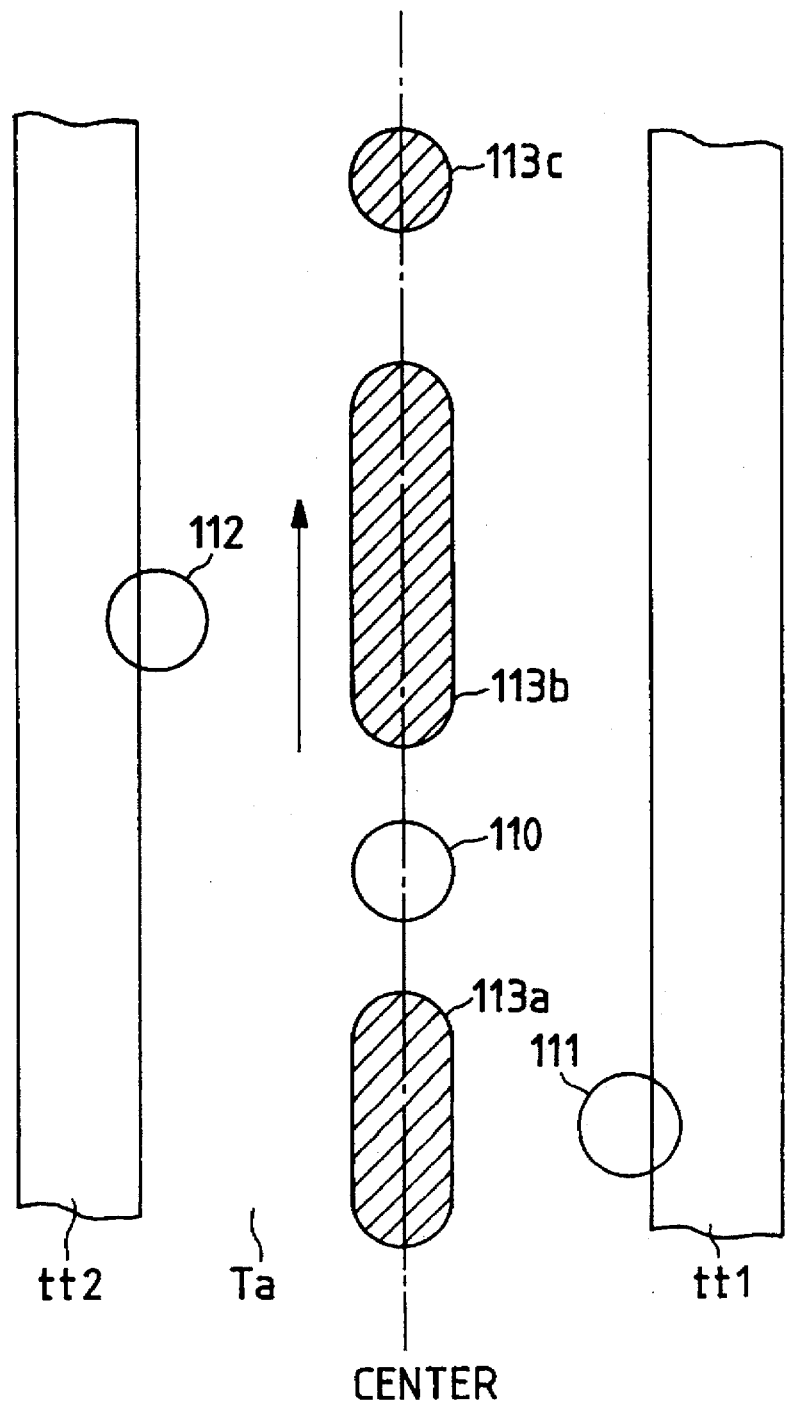
FIG. 3 is a partial enlarged view of the optical card shown in FIG. 1.
Figure 4:
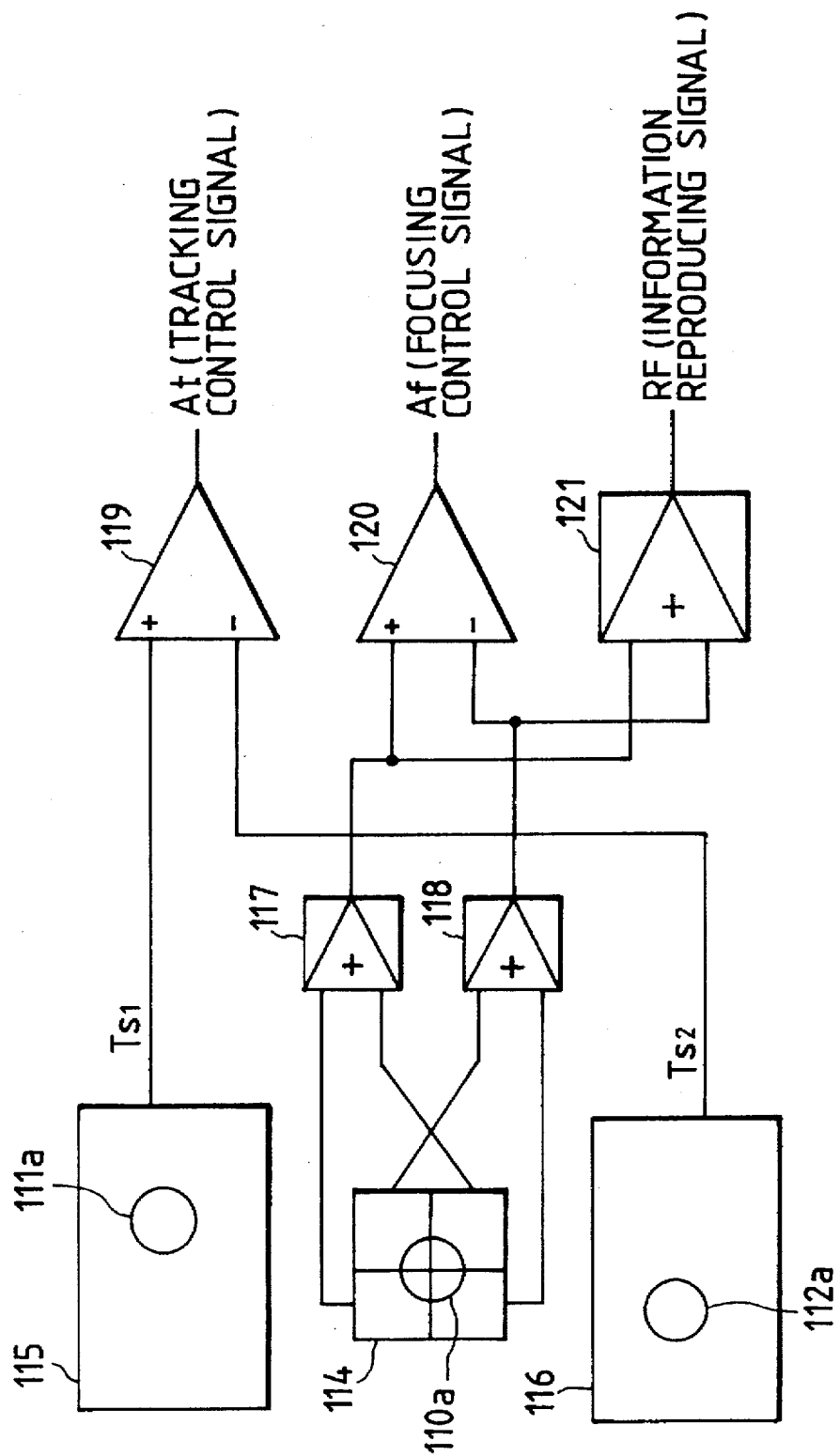
FIG. 4 is a circuit diagram showing the arrangement of a photodetector 109 shown in FIG. 2, and a signal processing circuit for generating a reproducing signal and a servo error signal by processing the output signal from the photodetector.

More specifically, when an information track on the optical card shown in FIG. 1 is to be scanned, only the track numbers TN1 and TN2, and information in recorded sectors are reproduced. In this case, it is preferable to use the CD signal as a signal for identifying the track numbers TN1 and TN2, and sector information. That is, it can be determined that the light beam is scanning a track number or a recorded sector while the CD signal is at high level; the light beam is present on a portion between a track number and a sector or a portion between adjacent sectors while the CD signal is at low level. Therefore, by monitoring the CD signal, the current scanning position of the light beam can be detected, and this is convenient in controlling the recording/reproduction timings. However, when the CD signal is used as a reference signal for control, it is not preferable if the CD signal is interrupted in the middle of an information pit train, as described above.

Figure 9:
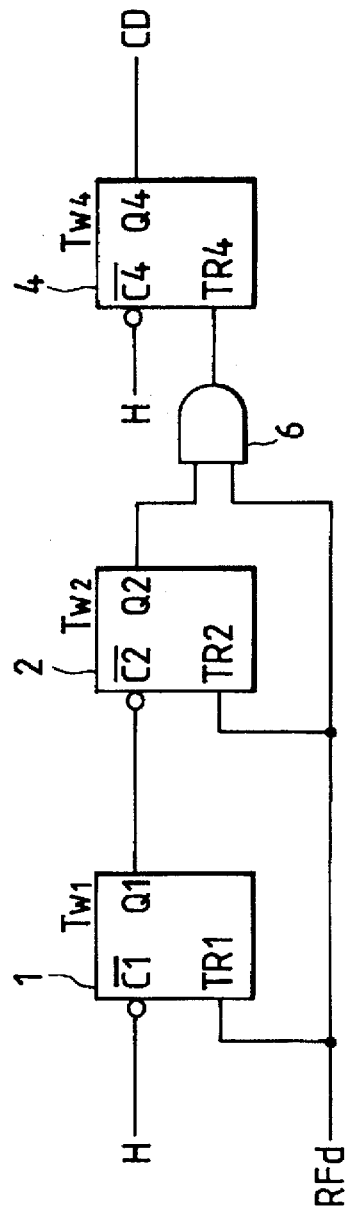
FIG. 9 is a circuit diagram showing the second embodiment of the present invention.

Thus, the second embodiment solves interruption of the CD signal, and allows the CD signal to be used in the control for the recording/reproduction timings of information. FIG. 9 is a circuit diagram showing the second embodiment of the present invention. Referring to FIG. 9, the multivibrators 1 and 2 are the same as those in the embodiment shown in FIG. 7. The output Q2 from the multivibrator 2 and the binary signal RFd are logically ANDed by an AND gate 6, and the output from the AND gate 6 is input to a trigger input terminal TR4 of a multivibrator 4. The multivibrator 4 is a re-triggerable monostable multivibrator like the multivibrators 1 and 2. A clear input terminal (inverting input terminal) $\overline{C4}$ of the multivibrator 4 is normally kept at high level, and its output Q4 is output as a CD signal.

The operation of this embodiment will be described in detail below with reference to FIGS. 10A to 10F. FIG. 10A shows information pits recorded on an information track. Information pits P11 to P17 form one information pit train, and information pits P18 to P20 form another information pit train. More specifically, the information pits P11 to P18 correspond to a pit train representing, e.g., one track number or recorded sector, and the information pits P18 to P20 correspond to a pit train representing another track number or recorded sector. A defect D3 is present on the information pits P14 and P15 and masks them. FIG. 10B shows the binary signal RFd obtained by scanning the information track shown in FIG. 10A. The output Q1 of the multivibrator 1 goes high in response to the leading edge of the information pit P11, as shown in FIG. 10C, and the setting time period $T_{w1}$ of the multivibrator 1 is set to be longer than the time period $T_{pm}$ required for scanning the maximum pit pitch with the light beam as in the embodiment shown in FIG. 7. For this reason, the output Q1 is kept at high level as long as information pits successively appear. Since the defect D3 is present in the middle of the information pit train, the output Q1 from the multivibrator 1 goes low after an elapse of the time period $T_{w1}$ from the leading edge of the defect D3.

On the other hand, the output Q2 of the multivibrator 2 goes high in response to the leading edge of the information pit P12, and goes low after an elapse of the time period $T_{w1}$ from the leading edge of the defect D3 as in the output Q1 of the multivibrator 1, as shown in FIG. 10D. Since the binary signal RFd is gated by the output Q2 of the multivibrator 2 in the AND gate 6, the trigger input terminal TR4 of the multivibrator 4 receives a trigger signal, as shown in FIG. 10E. In response to this signal, the output Q4 of the multivibrator 4 goes high in response to the leading edge of the information pit P12, as shown in FIG. 10F, and is output as a CD signal. Note that the output timing of the CD signal is slightly delayed due to the delay time of the circuit in practice, but this delay time is negligible as compared to the scanning time of the pits.

When a time period required for scanning a portion from the leading edge of the defect D3 to the leading edge of the last information pit P17 of the pit train is represented by $T_d$, a setting time period $T_{w4}$ of the multivibrator 4 is set to be longer than $T_d$ ($T_{w4} > T_d$). Therefore, even when the outputs Q1 and Q2 of the multivibrators 1 and 2 go low after an elapse of $T_{w1}$ from the leading edge of the defect D3, the output Q4 of the multivibrator 4 is maintained at high level, and the CD signal is output without being interrupted, as shown in FIG. 10F. The outputs Q1 and Q2 of the multivibrators 1 and 2 respectively go low after an elapse of the time period $T_{w1}$ from the leading edge of the last information pit P17 in the pit train, as shown in FIGS. 10C and 10D. The output Q4 of the multivibrator 4 is triggered by the leading edge of the information Bit P17, as shown in FIG. 10F, and goes low after an elapse of the time period $T_{w4}$ from the trigger timing. Therefore, the CD signal is kept output from the second information pit P12 in the pit train to a time after an elapse of the time period $T_{w4}$ from the leading edge of the last information pit P17 in the pit train. For one pit train, a recorded signal is detected, as described above, and for another pit train starting from the next information pit P18, a recorded signal is similarly detected. In FIG. 10A, the time interval between two adjacent pit trains is $T_s$. In this case, in order to set the CD signal at low level on a portion between the adjacent pit trains, $T_{w4} < T_s$ must be satisfied. As the time interval $T_s$, the shortest one of various sector patterns to be recorded must be selected.

In this embodiment, even when a defect is present in an information pit train, the CD signal can be kept output without being interrupted. In this case, the CD signal can be prevented from being interrupted due to a defect having a length equal to or smaller than the minimum inter-sector interval. Therefore, the CD signal can be used not only for detection of a recorded signal but also as a signal representing the period of a track number or recorded sector, and can be utilized in control of the recording/reproduction timings.

Figure 11:
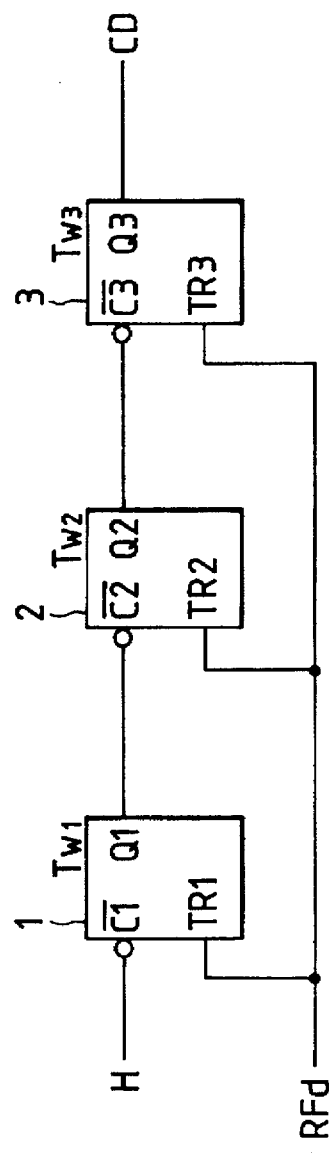
FIG. 11 is a circuit diagram showing the third embodiment of the present invention.

The third embodiment of the present invention will be described below. Defects on the recording medium include not only large ones but also very small ones, and the probability of the presence of such a very small defect within a maximum pit pitch is not small. When such a very small defect is present, a CD detection error may occur due to the very small defect in the embodiments shown in FIGS. 7 and 9. Thus, the third embodiment which can solve the problems caused by a very small defect will be described below. FIG. 11 is a circuit diagram showing the third embodiment of the present invention. Referring to FIG. 11, the multivibrators 1 and 2 are the same as those in the embodiment in FIG. 7, and a multivibrator 3 is connected to the output side of the multivibrator 2. The multivibrator 3 is also a re-triggerable monostable multivibrator like the multivibrators 1 and 2. The output Q2 of the multivibrator 2 and the binary signal RFd are respectively input to a clear input terminal (inverting input terminal) $\overline{C3}$ and a trigger input terminal TR3 of the multivibrator 3, and its output Q3 is output as a CD signal.

The operation of this embodiment will be described below with reference to FIGS. 12A to 12E. FIG. 12A shows defects and information pits on an information track. D4 to D6 represent defects, and P1 to P6 represent information pits. A time period $T_{dp1}$ for scanning the pitch of the defects D4 and D5 is shorter than the setting time period $T_{w1}$ of the multivibrator 1 ($T_{dp1} < T_{w1}$), and a very small defect is present within the maximum pit pitch. The setting time period $T_{w1}$ of the multivibrator 1 is set to be longer than the time period required for scanning the maximum pit pitch as in the first and second embodiments. The defects D5 and D6 are separated by a time period $T_{w1}$ or more, and thereafter, the information pits P1 to P6 are recorded.

When the information track shown in FIG. 12A is scanned, the binary signal RFd is output, as shown in FIG. 12B. The output Q1 of the multivibrator 1 goes high in response to the leading edge of the defect D4, the multivibrator 1 is re-triggered by the leading edge of the defect D5, and the output Q1 goes low after an elapse of the time period $T_{w1}$ from the re-trigger timing, as shown in FIG. 12C. The output Q2 of the multivibrator 2 goes high in response to the leading edge of the defect D5, and goes low simultaneously with the output Q1 of the multivibrator 1, as shown in FIG. 12D. The output Q3 of the multivibrator 3 is kept at low level, as shown in FIG. 12E, and no CD signal is output. In the first and second embodiments, when the two very small defects D4 and D5 successively appear, as shown in FIG. 12A, a detection error occurs. However, in this embodiment, since the multivibrator 3 is connected to the output side of the multivibrator 2, no CD signal is output, and the very small defects are not erroneously detected. As for the defect D6 after the defect D5, no CD signal is output since the defect D6 is isolated.

On the other hand, when the information pits P1 to P6 are scanned, the output Q3 of the multivibrator 3 goes high in response to the leading edge of the information pit P3, and a CD signal is output from the third pit after the first pit P1, as shown in FIG. 12E. More specifically, since the multivibrator 3 is connected to inhibit a CD signal from being output even when two very small defects successively appear, information pits cannot be detected unless three or more information pits successively appear. In order to decrease the probability of detection errors of very small defects, the detection sensitivity of information pits is lowered to three pits. Therefore, when a recording medium on which a large number of very small defects successively appear at a pitch equal to or smaller than $T_{w1}$ is used, re-triggerable monostable multivibrators corresponding in number to successive defects can be connected to the output side of the multivibrator 3, thereby preventing detection errors caused by these defects. However, in this case, the detection sensitivity of information pits is lowered accordingly.

As described above, in this embodiment, when very small defects successively appear within the maximum pit pitch, they can be prevented from being detected as information pits although no information signal is recorded, and the detection reliability of an information signal can be improved. In the third embodiment, when a plurality of multivibrators are connected, detection errors caused by defects can be prevented according to the number of multivibrators connected. However, a recording medium on which a large number of very small defects successively appear at a pitch equal to or smaller than $T_{w1}$ loses a function of a recording medium, and it normally suffices to use an arrangement including three multivibrators, as shown in FIG. 11. When the multivibrator 4 is connected to the output side of the multivibrator 3 via the AND gate 6, as shown in FIG. 9, interruption of a CD signal in a pit train can be prevented. Thus, the CD signal can also be used as a signal representing the period of a track number or recorded sector as in the second embodiment.

The fourth embodiment of the present invention will be described below. As described above, very small defects are often present on a recording medium. In particular, on an optical recording medium such as an optical disk, a plurality of very small defects are often successively present. In this case, in order to prevent detection errors due to very small defects in the third embodiment, a large number of multivibrators are required, and the detection sensitivity of information pits is undesirably lowered. The fourth embodiment which can solve such a problem will be described below.

Figure 13:
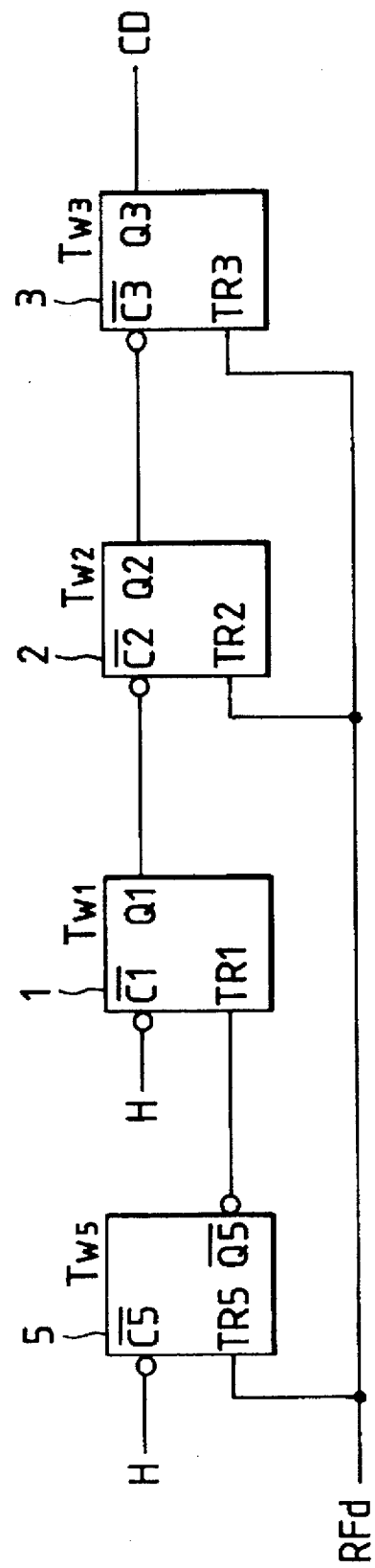
FIG. 13 is a circuit diagram showing the fourth embodiment of the present invention.

FIG. 13 is a block diagram showing the fourth embodiment of the present invention. In this embodiment, a multivibrator 5 is connected to the input side of the circuit constituted by the three multivibrators 1 to 3 shown in FIG. 11. The multivibrator 5 is similarly a re-triggerable monostable multivibrator. A clear input terminal (inverting input terminal) $\overline{C5}$ is normally held at high level, and its trigger input terminal TR5 receives the binary signal RFd. An output (inverted output) $\overline{Q5}$ of the multivibrator 5 is input to the trigger input terminal TR1 of the multivibrator 1. A setting time period $T_{W5}$ of the multivibrator 5 is set to be slightly shorter than the scanning time of the minimum pit pitch.

The operation of this embodiment will be described below with reference to FIGS. 14A to 14F. FIG. 14A shows defects and an information pit train on an information track. Defects D6 to D10 are locally present at a high density, and their maximum pitch $T_{dp2}$ is shorter than the setting time period $T_{W5}$ of the multivibrator 5. After the defect train, information pits P1 to P6 are recorded. FIG. 14B shows a binary signal RFd obtained by scanning the information track shown in FIG. 14A. The output $\overline{Q5}$ (inverted output) of the multivibrator 5 goes low in response to the leading edge of the defect D6, as shown in FIG. 14C, and thereafter, the multivibrator 5 is re-triggered by the leading edges of the respective defects since the pitch $T_{dp2}$ of the defects is shorter than the setting time period $T_{W5}$ of the multivibrator 5. Therefore, the output $\overline{Q5}$ of the multivibrator 5 is kept at low level while the defects D6 to D10 are scanned, and goes high after an elapse of the time period $T_{W5}$ from the leading edge of the defect D10.

When the output $\overline{Q5}$ of the multivibrator 5 goes high, the multivibrator 1 is triggered, and its output Q1 is maintained at high level from when the output $\overline{Q5}$ of the multivibrator 5 goes high until the time period $T_{W1}$ elapses, as shown in FIG. 14D. The multivibrators 2 and 3 operate in the same manner as in the embodiment shown in FIG. 11 upon triggering of the multivibrator 1. More specifically, the multivibrators 1 to 3 operate in substantially the same manner as in FIG. 11, except that they are triggered the time period $T_{W5}$ after the leading edge of the last defect D10 in the defect train in place of the leading edge of the first defect D6 in the defect train. Therefore, in this embodiment, the multivibrator 5 is connected at the input side of the multivibrator 1, and its setting time period $T_{W5}$ is set to be shorter than the scanning time of the minimum pit pitch. When very small defects are present at a high density, since the trigger input of the multivibrator 1 is masked by the output from the multivibrator 5, detection errors caused by very small defects can be prevented without connecting a large number of multivibrators even when a large number of very small defects successively appear.

When an information pit train is to be scanned, the multivibrators 1 to 3 operate in the same manner as in the embodiment shown in FIG. 11, as shown in FIGS. 14D to 14F. More specifically, when the multivibrators 1 to 3 detect information pits, a CD signal is output from the third information pit P3 after the first pit P1, and the detection sensitivity corresponds to three information pits. Therefore, even when a large number of very small defects successively appear locally, detection errors caused by very small defects can be prevented without lowering the detection sensitivity. When the setting time period $T_{W5}$ of the multivibrator 5 is set to be equal to or longer than the minimum pit pitch, the output from the multivibrator 5 is kept at a low level for a pit train in which information pits successively appear at the minimum pit pitch, and the multivibrator 1 cannot be triggered. For this reason, the time period $T_{W5}$ must be set to be shorter than the minimum pit pitch.

In the above embodiments, a recorded signal is detected using re-triggerable monostable multivibrators. In this case, since time need only be measured, the recorded signal can be detected using a counter circuit, microcomputer, and the like. The mark length method for recording information based on the pit size and the inter-pit distance has been exemplified as a method for recording onto a recording medium. However, the detection operation of each of the above embodiments does not depend on the pit size. For this reason, the present invention is also applicable to a mark position recording method for recording information based on the positions of pits having substantially the same size, as another typical recording method. In each of the above embodiments, detection of an optically recorded information signal has been exemplified. However, the present invention is not limited to this, and may be applied to all other recording methods such as magnetic recording, magnetooptical recording, and the like as long as information is recorded in the form of a digital signal.

What is claimed is:

1. An apparatus for detecting whether an information signal has been recorded on an information recording medium, said apparatus comprising:

means for reproducing a binary signal from the information recording medium;

means for producing a window with a predetermined time interval on the basis of an edge of the binary signal, wherein the predetermined time interval is longer than a time period of a maximum pulse interval of the binary signal; and detecting means for detecting that an information recording signal has been recorded on the recording medium when the binary signal changes a predetermined number of times within the window.

2. An apparatus according to claim 1, wherein said detecting means ignores a change in the binary signal a predetermined number of times within a time interval, which is shorter than a time period of a minimum pulse interval of the binary signal.

3. An apparatus according to claim 1, wherein said detecting means detects that the information signal has been recorded on the recording medium only when a change in the binary signal a predetermined number of times within a predetermined time interval continues a predetermined number of times.

4. An apparatus according to claim 1, wherein said detecting means outputs a detection signal when said detecting means detects that the information signal has been recorded on the recording medium.

5. An apparatus according to claim 4, wherein said detecting means comprises means for holding the detection signal for a predetermined period of time.

* * * * *

UNITED STATES PATENT AND TRADEMARK OFFICE
CERTIFICATE OF CORRECTION

PATENT NO. : 5,721,719
DATED : February 24, 1998
INVENTOR(S) : SHINICHI OHTA

It is certified that error appears in the above-identified patent and that said Letters Patent is hereby corrected as shown below:

COLUMN 7:

line 7, "Goes" should read --goes--.

COLUMN 9:

line 27, "Bit" should read --pit--.

Signed and Sealed this

Fifteenth Day of September, 1998

Attest:

BRUCE LEHMAN

Attesting Officer      *Commissioner of Patents and Trademarks*